(12) United States Patent
Sato et al.

(10) Patent No.: US 8,388,140 B2
(45) Date of Patent: Mar. 5, 2013

(54) PROJECTOR, PROJECTION SYSTEM, AND METHOD FOR CONTROLLING PROJECTION SYSTEM

(75) Inventors: Kaori Sato, Shiojiri (JP); Nobuhiro Karito, Matsumoto (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 12/836,890

(22) Filed: Jul. 15, 2010

(65) Prior Publication Data
US 2011/0075101 A1    Mar. 31, 2011

(30) Foreign Application Priority Data

Sep. 28, 2009  (JP) ................................ 2009-222589

(51) Int. Cl.
*G03B 21/26* (2006.01)
*G09G 5/02* (2006.01)
*H04N 3/22* (2006.01)
*G06K 9/52* (2006.01)
*G06K 9/34* (2006.01)

(52) U.S. Cl. ............. 353/31; 353/94; 345/1.3; 345/589; 348/745; 382/174; 382/206

(58) Field of Classification Search .................... 353/30, 353/94, 31; 345/589, 1.3; 348/745; 382/100, 382/206, 174
See application file for complete search history.

(56) References Cited

U.S. PATENT DOCUMENTS

| | | | |
|---|---|---|---|
| 6,540,363 B1 * | 4/2003 | Steffensmeier | 353/31 |
| 7,357,517 B2 | 4/2008 | Hasegawa | |
| 2005/0206856 A1 * | 9/2005 | Ishii | 353/94 |
| 2011/0249014 A1 * | 10/2011 | Kolstad et al. | 345/589 |

FOREIGN PATENT DOCUMENTS

| | | |
|---|---|---|
| JP | A-2006-229400 | 8/2006 |
| JP | A-2008-151838 | 7/2008 |

* cited by examiner

*Primary Examiner* — Tony Ko
*Assistant Examiner* — Magda Cruz
(74) *Attorney, Agent, or Firm* — Oliff & Berridge, PLC

(57) ABSTRACT

A projector projecting an image includes: an imaging unit taking an information transmission image which is part of a projected image of the other projector and includes drive condition information of the other projector; and a control unit changing drive conditions of the projector based on the drive condition information included in the information transmission image.

11 Claims, 6 Drawing Sheets

PROJECTOR, PROJECTION SYSTEM, AND METHOD FOR CONTROLLING PROJECTION SYSTEM

BACKGROUND

1. Technical Field

The present invention relates to projectors, projection systems, and methods for controlling the projection system.

2. Related Art

In recent years, a projector has been used in a presentation for an exhibition, an academic meeting, a conference, etc., or in a home theater. The use of the projector makes it easier to produce a large-screen display as compared to a direct-view-type display device such as a display, and thereby allows more people to view the same image and enhances convenience.

The concurrent use of a plurality of projectors makes it possible to display images side-by-side or display images so as to overlap each other. By using the projectors in the manner as described above, it is possible to obtain a larger and higher-resolution projected image by splitting a horizontally oriented image such as a panoramic photograph into a plurality of images and displaying the images side-by-side by using the projectors. In addition, it is possible to make a presentation while referring to a plurality of pieces of data without screen switching by displaying a plurality of tables or graphs at the same time by using two projectors.

However, when the projectors are used concurrently in the manner as described above, it is necessary to devise a new method of producing good quality image display. For example, when a panoramic photograph is displayed by piecing together a plurality of images, the positioning or color of the adjacent images has to be adjusted so that the joints of the images are not perceived by the observer.

It is for this reason that the ways to attain good display when a plurality of projectors are used concurrently have been proposed (for example, refer to JP-A-2006-229400 (Patent Document 1) and JP-A-2008-151838 (Patent Document 2)).

Patent Document 1 proposes a configuration which easily displays an image in which borders between the display images are not perceived when the images are joined together by using a plurality of projectors while making the edges of the images overlap one another. Specifically, each projector displays a dedicated image for good positioning of the borders of the images and information indicating the number and layout of projectors which are used, and takes images of the image and information displayed by an adjacent projector, thereby allowing a decision to be made about a part of the edge of the image displayed by each projector, the part in which the images overlap each other, and adjusting the luminance of the part where the images overlap each other. In this way, good image display is produced.

Moreover, Patent Document 2 proposes a configuration in which a control apparatus performing overall control of a plurality of projectors controls the luminance and chromaticity of the image projected from each projector in such a way as to prevent the borders generated by the difference in color between the images from being perceived at the border portions between the images when a plurality of images are joined together, and produces good image display.

Incidentally, a projector sometimes has a plurality of operation modes set in advance to make the user produce proper image display according to an image to be displayed or the usage of the projector. The "operation modes" here refer to drive conditions of an image forming apparatus, a lamp, etc. installed in the projector and correction conditions of image data, the drive conditions and correction conditions set in advance to produce image display of intended image quality.

For example, in a "cinema mode" suitable for projecting a movie with good images, the drive conditions and correction conditions are set to make the color, contrast, brightness, etc. of the display images meet the conditions suitable for projecting a movie to make it possible to produce display with a quiet color and deep black display. Moreover, in a "data mode" suitable for displaying data such as a table and a graph, the drive conditions and correction conditions are set to meet the conditions in which emphasis is placed on contrast so as to make letters and lines more visible.

As a result of such "operation modes" having been set in advance, the user is allowed to obtain suitable image display easily.

However, when image display is performed by using a plurality of projectors in the manner as described above, the colors etc. of the projected images lose the unity if the projectors have identical operation modes, making it impossible to produce good image display as a whole.

For example, the recent technical development makes the projector compact and makes it easy to carry the projector around. Therefore, for example, when the projectors are used in different locations in different operation modes and are then brought together in one location, the projectors may have different starting operation modes.

Under such circumstances, when settings are changed individually to change the operation modes of the projectors, it takes time to install the projectors. Moreover, when the operation modes are reflected in each other's operations modes by performing two-way communication between the projectors, it is necessary to connect wires for wire connection and make corresponding projector settings and security settings for wireless connection, making the installation complicated.

SUMMARY

An advantage of some aspects of the invention is to provide a projector which can facilitate unified control of the operation modes of a plurality of projectors and improve usability when image display is performed by using the projectors. Another advantage of some aspects of the invention is to provide a projection system provided with such projectors and a method for controlling the drive conditions of the projectors in the projection system.

A projector according to an aspect of the invention is a projector projecting an image and including: an imaging unit taking an information transmission image which is part of a projected image of the other projector and includes drive condition information of the other projector; and a control unit changing drive conditions of the projector based on the drive condition information included in the information transmission image.

With this configuration, a projector can acquire the drive conditions of the other projector without performing two-way communication regardless of whether wire or wireless communication and change the drive conditions by reflecting the acquired drive conditions in the drive conditions thereof. As a result, it is possible to provide a projector which can facilitate unified control of the drive conditions of a plurality of projectors and improve usability.

According to the aspect of the invention, it is preferable that the control unit perform control so as to bring the drive conditions of the projector close to drive conditions of the other projector.

With this configuration, since the drive conditions of the projectors used concurrently are brought close to each other, it is possible to reduce a mismatch in image quality of the projected images between the projectors.

According to the aspect of the invention, preferably, the projector can display the information transmission image including the drive conditions thereof in a position where the information transmission image does not overlap the information transmission image of the other projector.

With this configuration, since the projector itself can also send the drive conditions, it is possible to perform unified control of the drive conditions, the unified control that not only allows the projector to match the drive conditions thereof with the drive conditions of the other projector, but also allows the other projector to match the drive conditions thereof to the drive conditions of the projector.

According to the aspect of the invention, it is preferable that the information transmission image be formed by using infrared light.

With this configuration, even when the information transmission image is displayed in such a way as to overlap an image which is originally intended to be projected, the information transmission image is not visible to the observer. This makes it possible to change the drive conditions by using the information transmission image without impairing the image.

According to the aspect of the invention, it is preferable that the information transmission image be formed by using image data which is the drive condition information converted into a code.

With this configuration, since the data amount can be reduced by converting the drive condition information into a code, it is possible to transmit a lot of information. Moreover, since the size of the information transmission image can be reduced by reducing the data amount, even when a plurality of information transmission images are displayed to make sure the images are read by an imaging apparatus, for example, it is possible to display the plurality of information transmission images in a narrow display area.

Moreover, a projection system according to another aspect of the invention includes a pair of projectors performing image display in adjacent areas, one projector displays an information transmission image including drive condition information thereof, and the other projector has an imaging unit that can take the information transmission image, and changes drive conditions thereof based on the drive condition information of the one projector, the drive condition information being included in the information transmission image taken by the imaging unit.

With this configuration, by transmitting the drive information via the information transmission image, it is possible to make the drive conditions of the other projector follow the drive conditions of the one projector without using two-way communication regardless of whether wire or wireless communication. As a result, it is possible to provide a projection system which can facilitate unified control of the drive conditions of the projectors and improve usability.

According to the aspect of the invention, it is preferable that each of the pair of projectors display the information transmission image and have the imaging unit.

With this configuration, since the pair of projectors can change the drive conditions thereof by referring to each other's drive conditions, it is possible to increase the options for a projector used as a criterion for drive conditions and increase flexibility.

According to the aspect of the invention, it is preferable that the other projector perform control so as to bring the drive conditions thereof close to drive conditions of the one projector based on the drive condition information of the one projector.

With this configuration, it is possible to reduce the difference in the quality of images displayed by the projectors by brining the drive conditions of the pair of projectors close to each other with ease by using the drive conditions of one projector as a criterion.

According to the aspect of the invention, it is preferable that the pair of projectors change the drive conditions thereof in such a way that the drive conditions are brought close to each other's drive conditions based on each other's drive condition information included in the information transmission images taken by the imaging units of the pair of projectors.

With this configuration, it is possible to bring the drive conditions of the pair of projectors close to each other with ease by using new drive conditions which are different from each other's drive conditions as a criterion and reduce the difference in the quality of images displayed by the projectors. As a result, when the drive conditions of a projector cannot be set to the drive conditions of the other projector used as a criterion because the projectors are different in performance, for example, the drive conditions of the projectors can be unified by setting new drive conditions to which the drive conditions of the projectors can be set.

Moreover, a method for controlling a projection system according to still another aspect of the invention is a method for controlling a projection system having a pair of projectors, and includes displaying an information transmission image by one projector, the information transmission image including drive condition information of the one projector; taking the information transmission image displayed by the one projector with an imaging unit of the other projector; and changing drive conditions of the other projector based on the drive condition information of the one projector, the drive condition information being included in the information transmission image.

This method facilitates unified control of the drive conditions of the projectors of the projection system.

Furthermore, a method for controlling projection system according to yet another aspect of the invention is a method for controlling a projection system having a pair of projectors, and includes displaying an information transmission image by each of the pair of projectors, the information transmission image including drive condition information of each of the pair of projectors; taking the information transmission images with imaging units of the pair of projectors, the information transmission images displayed by one projector for the other projector and displayed by the other projector for the one projector; and changing drive conditions of the projectors in such a way that the drive conditions are brought close to each other's drive conditions based on each other's drive condition information included in the information transmission images.

By this method, even when one projector cannot match the drive conditions thereof with the drive conditions of the other projector, the drive conditions are controlled in such a way that the drive conditions are brought close to each other's drive conditions. This facilitates unified control of the drive conditions of the projectors of the projection system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector, a projection system, and a method for controlling the projection system according to an embodiment of the invention will be described with reference to FIGS. 1 to 6. Incidentally, in all of the following drawings, the sizes and ratio of the component elements are appropriately changed to make the drawings more visible.

Figure 1:
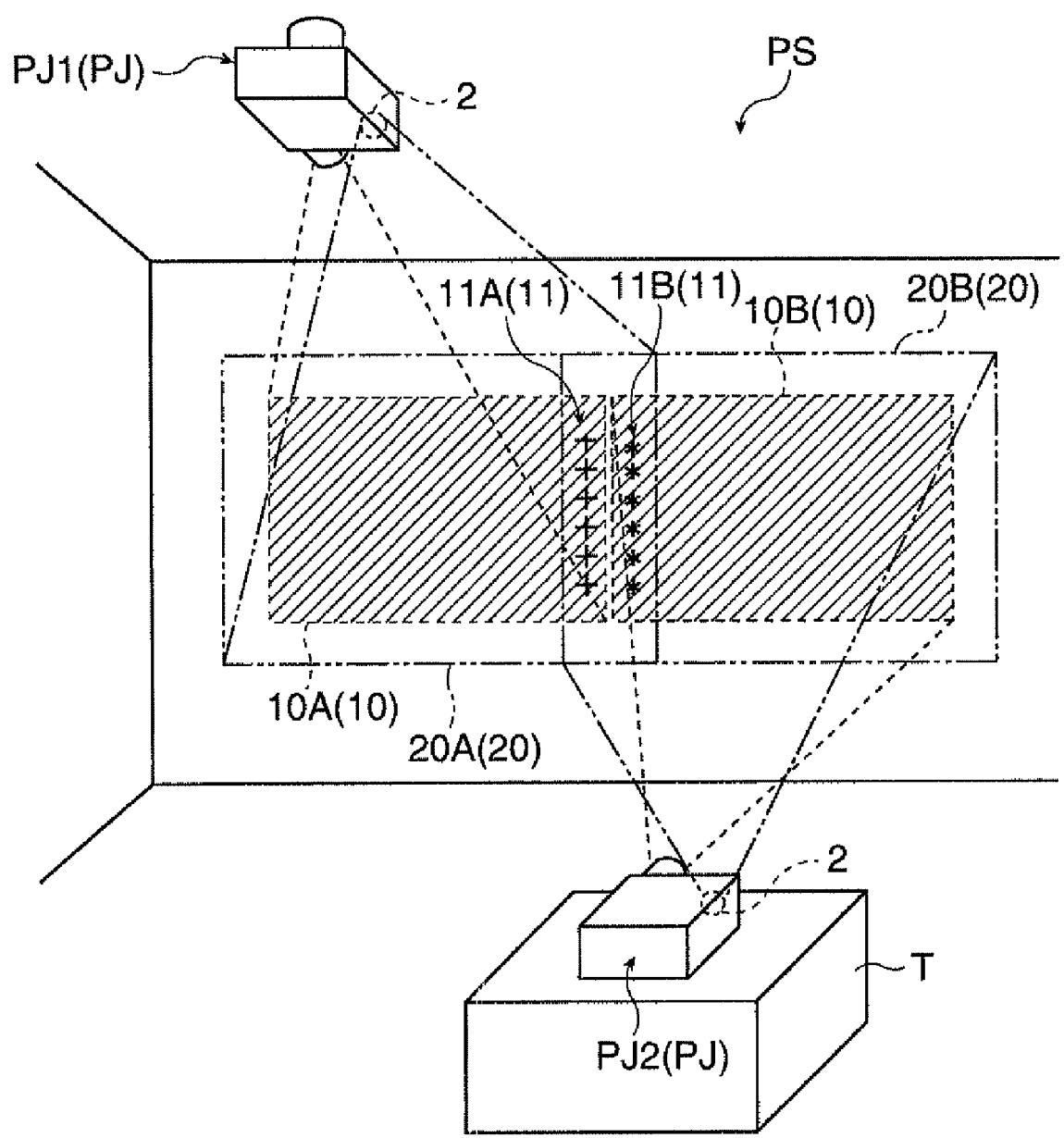
FIG. 1 is a schematic diagram showing a projector and a projection system of an embodiment of the invention.

FIG. 1 is a schematic diagram showing a projector PJ and a projection system PS which are used in this embodiment. As shown in this drawing, the projection system PS of this embodiment includes two projectors PJ1 and PJ2.

The projector PJ1 has an imaging apparatus (an imaging unit) 2 that can take an image of an imaging area 20A which is a size larger than a projection area 10A and includes the projection area 10A. Likewise, the projector PJ2 has an imaging apparatus (an imaging unit) 2 that can take an image of an imaging area 20B which is a size larger than a projection area 10B and includes the projection area 10B.

In this drawing, the projector PJ1 is mounted on the ceiling in a stationary state so as to be suspended therefrom, and the projector PJ2 is used by being installed on an installation platform T in such a way that the projector PJ2 can be carried at any time. The installation state shown in this drawing is an example; the two projectors PJ may be mounted in a stationary state or installed in such a way that the two projectors PJ can be carried at any time.

The projectors PJ each display an information transmission image 11 on the edge of the projection area 10. The information transmission image is an image including the current drive conditions and operation mode of each projector PJ as transmission information. In this specification, the information on the drive conditions and the information on the operation mode may be collectively referred to as drive condition information. Moreover, since the information transmission image displayed by one projector is displayed in a position in which the information transmission image does not overlap the information transmission image displayed by the other projector, the information transmission images do not interfere with each other.

Here, the "drive conditions" refer to conditions such as the drive conditions of an optical unit including an image forming apparatus, a lamp, etc. installed in the projector PJ and the correction conditions of image data. When the drive conditions are changed, the color, contrast, and brightness (luminance) of the projected image of the projector PJ and an image processing method (image stretching processing according to the type of input image such as moving images and still images, tint correction processing, etc.) are changed.

Moreover, the "operation mode" is a group of drive conditions of the components included in the optical unit and correction conditions for the image data, the drive conditions and the correction conditions which are set in advance to produce image display with intended image quality and are brought together to correspond to the intended image quality.

The information transmission image 11 can include various pieces of information as needed. For example, the information transmission image 11 can include performance information on the performance (the scope of the settable drive conditions) of the projector PJ.

The information transmission image 11 is projected with appropriate timing in the course of changing the drive conditions of the projector PJ, and automatically disappears after being displayed for a time sufficiently long enough for the imaging apparatus 2 to take the information transmission image 11. Alternatively, when the imaging apparatus 2 is an image sensing device such as a CCD or a CMOS, the information transmission image 11 may be displayed at all times while the projector PJ is operating by forming the information transmission image 11 by using infrared light which can be sensed by the imaging apparatus 2 but cannot be perceived by the observer.

As long as the information transmission image 11 is placed in the imaging area 20 whose image is taken by the imaging apparatus 2 of the other projector, the information transmission image 11 may be displayed in any place in the projection area 10. In the drawing, the information transmission images 11 are provided in the two projection areas 10A and 10B along the sides thereof each facing the adjacent projection area; however, the information transmission images 11 may be displayed in other parts when needed. Moreover, the information transmission image 11 is displayed along only one side of the projection area 10; however, the information transmission image 11 may be displayed along right and left sides of the projection area 10.

As such an information transmission image, an image which can display much information in a small display area is preferable. For example, a QR code (registered trademark) which is a matrix two-dimensional code, other matrix two-dimensional codes, a stacked two-dimensional code in the form of stacked barcodes, and a three-dimensional code in which a two-dimensional code is changed in chronological order can be used.

In the above-structured projection system PS of this embodiment, the projector PJ2 takes an information transmission image 11A including the information on the current drive conditions of the projector PJ1, the information transmission image 11A projected by the projector PJ1, with the imaging apparatus 2, whereby the projector PJ2 can change the drive conditions of the projector PJ2 in such a way that the drive conditions of the projector PJ2 are brought close to the drive conditions of the projector PJ1 based on the information on the drive conditions included in the information transmission image 11A.

Conversely, the projector PJ1 takes an information transmission image 11B including the information on the current drive conditions of the projector PJ2, whereby the projector PJ1 can change the drive conditions of the projector PJ1 in such a way that the drive conditions of the projector PJ1 are brought close to the drive conditions of the projector PJ2 based on the information on the drive conditions included in the information transmission image 11B.

Furthermore, the projectors PJ1 and PJ2 take the information transmission images of the projectors PJ2 and PJ1, respectively, whereby the projectors PJ1 and PJ2 can acquire each other's drive conditions and change their drive conditions in such a way that the drive conditions of the projectors PJ1 and PJ2 are brought close to the drive conditions of the projectors PJ2 and PJ1, respectively. A detailed description will be given below.

Figure 2:
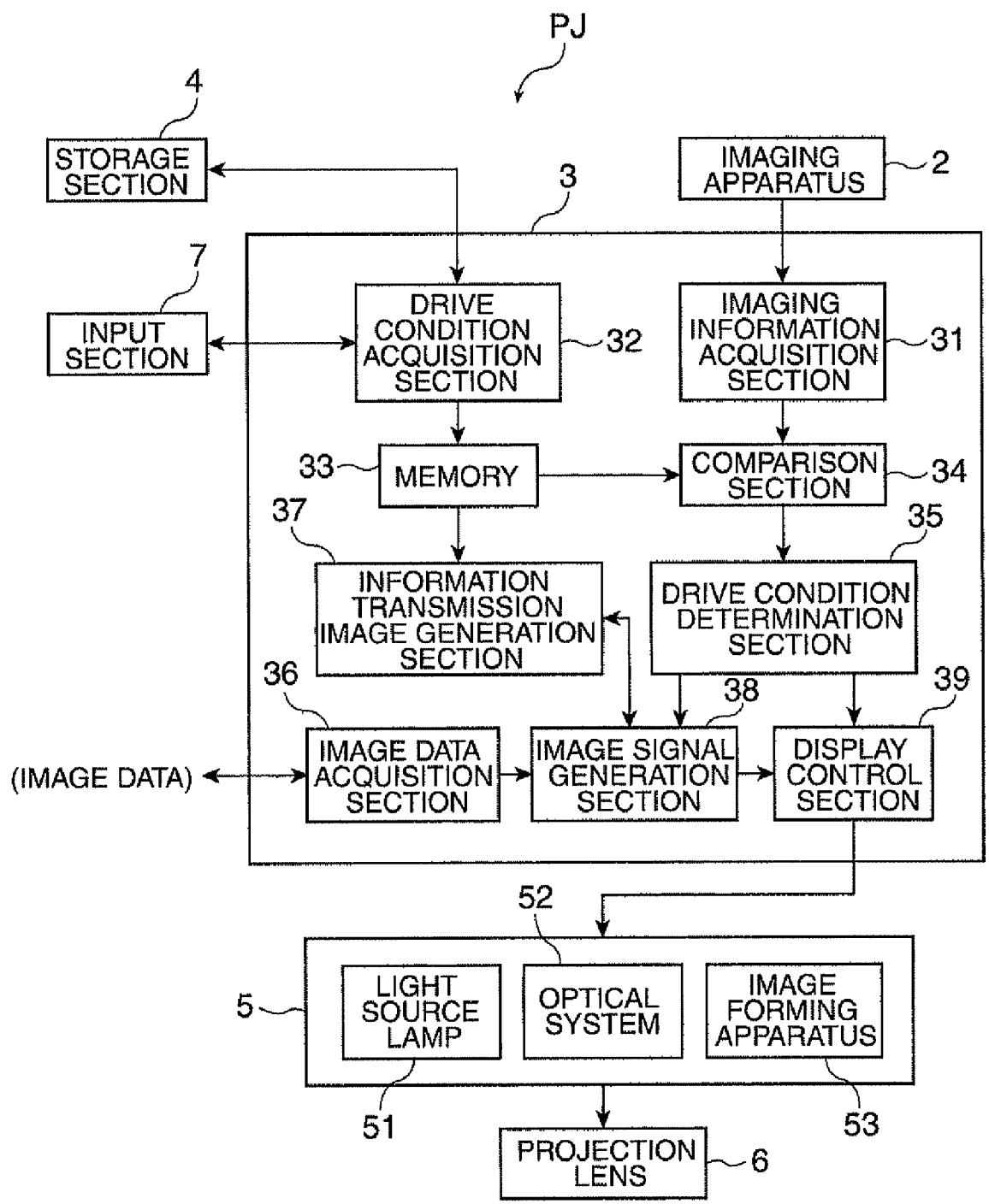
FIG. 2 is a block diagram showing principal portions of the projector of the embodiment of the invention.

FIG. 2 is a block diagram showing the principal portions of the projector PJ. As shown in the drawing, the projector PJ includes an imaging apparatus 2, a control section (a control unit) 3 generating a drive signal for the optical unit based on the image data, a storage section 4 storing the operation modes, an optical unit 5 and a projection lens 6 projecting an image based on the drive signal, and an input unit 7 with which the user of the projector PJ specifies the drive conditions of the projector PJ. Hereinafter, a description will be given by using the numerals and signs shown in FIGS. 1 and 2 when necessary.

The imaging apparatus 2 is provided with an image sensing device such as a CCD or a CMOS, and can take an image of the imaging area. The imaging apparatus 2 may be so configured as to take an image of the imaging area continuously during operation or may be started when necessary to take an image of the imaging area. The image taken by the imaging apparatus 2 is output to the control section 3.

The control section 3 includes an imaging information acquisition section 31, a drive condition acquisition section 32, a memory 33, a comparison section 34, a drive condition determination section 35, an image data acquisition section 36, an information transmission image generation section 37, an image signal generation section 38, and a display control section 39. These sections will be described in detail later.

The storage section 4 stores the operation modes of the projector PJ. As a result of such operation modes having been set in advance, the user can select an intended operation mode when necessary and attain suitable image display easily.

The optical unit 5 includes a light source lamp 51 formed of a gas light-emitting light source such as a metal halide lamp, a halogen lamp, and a high-pressure mercury-vapor lamp, an optical system 52 formed of an optical integration system, a color separation system, a relay system, and the like, and an image forming apparatus 53 formed of a liquid crystal light valve and a DMD (digital micro mirror device).

Incidentally, the configuration of the optical system 52 is appropriately changed according to the type of optical modulator, and is not limited to the configuration described above. In addition, the configuration of the optical system 52 is common and used in a normal projector, and therefore detailed descriptions thereof will be omitted.

The projection lens 6 projects an optical image emitted from the optical unit 5, and is provided with, in addition to an unillustrated lens shift mechanism for adjusting the projection position of the projection area, well-known automatic focus mechanism, automatic zooming mechanism, and the like, if necessary.

The input unit 7 is used by the user of the projector PJ to specify the drive conditions of the projector PJ, and examples thereof include an input button provided on the body of the projector PJ and a remote control switch provided separately from the projector PJ.

Next, the components of the control section 3 will be described. The control section 3 performs drive condition adjustment processing broadly including "drive condition change processing" by which the drive conditions of the projector PJ are changed by referring to the drive conditions included in the information transmission image taken by the imaging apparatus 2 and the operation modes stored in the storage section 4 and "drive condition display processing" by which the current drive conditions of the projector PJ are displayed.

The "drive condition change processing" is performed mainly by the functions of the imaging information acquisition section 31, the drive condition acquisition section 32, the comparison section 34, and the drive condition determination section 35. Moreover, the "drive condition display processing" is performed mainly by the functions of the information transmission image generation section 37, the image signal generation section 38, and the display control section 39.

First, the information transmission image taken by the imaging apparatus 2 is input to the imaging information acquisition section 31. The imaging information acquisition section 31 has the function of analyzing the information transmission image taken by the imaging apparatus 2, acquiring the drive conditions included in the information transmission image, and outputting the drive conditions to the comparison section 34.

The drive condition acquisition section 32 has the function of acquiring the drive conditions input from the input unit 7 and temporarily storing the drive conditions in the memory 33. When an instruction of the input drive conditions specifies any one of the plurality of operation modes stored in the storage section 4 in advance, the drive condition acquisition section 32 retrieves the plurality of drive conditions included in the operation mode from the storage section 4 and outputs the drive conditions to the memory 33. Moreover, when an instruction of the input drive conditions specifies the drive conditions of the components of the optical unit 5 individually, the drive condition acquisition section 32 outputs the specified drive conditions to the memory 33.

The comparison section 34 compares the drive conditions (first drive conditions) included in the information transmission image obtained from the imaging information acquisition section 31 with the drive conditions (second drive conditions) temporarily stored in the memory 33, determines whether the drive conditions coincide with each other, and outputs both drive conditions and the determination result to the drive condition determination section 35. Moreover, when no input is input from the imaging apparatus 2, since the second drive conditions which are the current drive conditions are naturally stored in the memory 33, the comparison section 34 outputs the second drive conditions to the drive condition determination section 35.

The drive condition determination section 35 determines the drive conditions of the projector PJ based on the drive conditions and the determination result obtained from the comparison section 34, and outputs the drive conditions to the image signal generation section 38 and the display control section 39.

Here, when the first drive conditions and the second drive conditions coincide with each other, or when no input is input from the imaging apparatus 2 and only the second drive conditions are obtained, the drive condition determination section 35 outputs an instruction to keep the second drive conditions. When the drive conditions are different, the drive condition determination section 35 outputs an instruction to change the second drive conditions which are the current drive conditions to the first drive conditions, for example.

On the other hand, the image data of a content image supplied from a PC or an audio visual system, for example, is input to the image data acquisition section 36. The image data acquisition section 36 outputs the acquired image data to the image signal generation section 38.

When an instruction to generate an information transmission image is input via an unillustrated instruction path, the information transmission image generation section 37 acquires the second drive conditions temporarily stored in the memory 33 and generates the image data of an information transmission image. The generated image data is output to the image signal generation section 38.

The image signal generation section 38 generates an image signal which becomes the basis of a projected image based on the drive conditions acquired from the drive condition determination section 35 and the image data acquired from the image data acquisition section 36 and the information transmission image generation section 38. In other words, based on the drive conditions determined by the drive condition determination section 35, the image signal generation section 38 generates corrected image data which is the image data whose color has been corrected, for example, and generates an image signal for displaying a projected image based on the corrected image data.

Based on the drive conditions obtained from the drive condition determination section 35 and the image signal obtained from the image signal generation section 38, the display control section 39 generates a drive signal for forming an optical image based on the image data, and outputs the drive signal to the optical unit 5. The light source lamp 51, the optical system 52, the image forming apparatus 53, and the like, which form the optical unit 5 are driven based on the input drive signal, and display an image in the set operation mode or under the set drive conditions.

The projector of this embodiment is configured as described above.

Next, processing performed in the projection system when display is performed by using the above-described projection system PS will be described. Hereinafter, a case in which the projectors forming the projection system are identical in performance and a case in which the projectors forming the projection system are different in performance will be described separately. In the descriptions, the numerals and signs shown in FIGS. 1 and 2 are used when necessary.

A Case in which the Projectors are Identical in Performance

Figure 3:
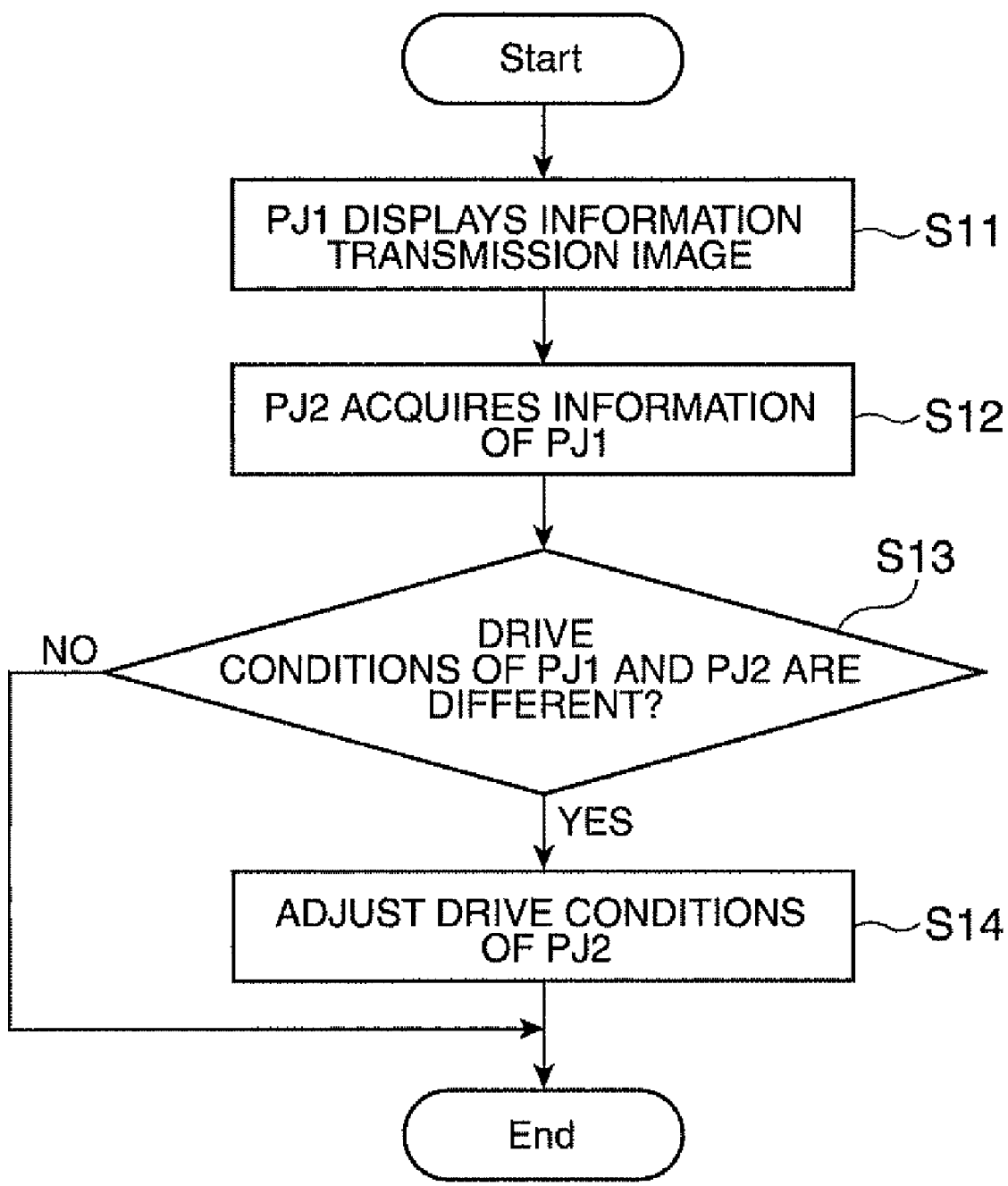
FIG. 3 is a flowchart showing a method for controlling the projection system of the embodiment of the invention.

FIG. 3 is a flowchart explaining a method for controlling the drive conditions of the projection system when the projectors are identical in performance.

First, the user selects a projector (for example, the projector PJ1) used as a criterion for drive conditions, and inputs an instruction to the projector PJ1 to display the information transmission image 11A. Then, the projector PJ1 displays the information transmission image 11A in the projection area (step S11).

Next, the user inputs an instruction to make the imaging apparatus 2 of the projector PJ2 function, and starts the drive condition adjustment processing of the projector PJ2. When the information transmission image 11A of the projector PJ1 is displayed in the imaging area 20 of the imaging apparatus 2 of the projector PJ2, the projector PJ2 acquires the drive condition information of the projector PJ1 (step S12).

The control section 3 of the projector PJ2 compares the drive conditions of the projectors PJ1 and PJ2 in the manner as described above, and determines whether to change the drive conditions of the projector PJ2 (step S13). When the drive conditions coincide with each other, the control section 3 ends the drive condition adjustment processing without changing the settings of the drive conditions.

When the drive conditions are different, the projector PJ2 changes the drive conditions thereof to the drive conditions of the projector PJ1 (step S14).

In this way, the drive conditions of the projection system PS are adjusted.

In such a projection system PS, for example, the projector PJ1 is first started at the start of the use of the projection system PS and the operation mode is set, and then the projector PJ2 is started. In such a case, the projector PJ1 displays an information transmission image, and the projector PJ2 takes that image and matches the drive conditions thereof with those of the projector PJ1, whereby it is possible to make the drive conditions of the projection system PS uniform with ease.

Moreover, when the drive conditions are changed while the projection system PS is being used, the drive conditions of one projector (for example, the projector PJ1) are changed, the projector PJ1 is made to display an information transmission image, and the projector PJ2 takes that image and matches the drive conditions thereof with those of the projector PJ1, whereby it is possible to make the drive conditions of the projection system PS uniform with ease.

A Case in which the Projectors are Different in Performance

When the projectors forming the projection system PS are different in performance, there may be a case in which the drive conditions of one projector cannot be set to the drive conditions of the projector specified by the user as a criterion. In such a case, as the method for controlling the drive conditions, the following two control methods, for example, can be provided.

First, both the two control methods allow each of the projectors forming the projection system to display the information transmission image and obtain the drive information by taking the information transmission image. Moreover, each information transmission image includes information on the operation mode indicating in which mode the projector is operating, information on various drive conditions set in each operation mode, and information on the performance (the scope of the settable drive conditions) of each projector.

The following description will be given on the assumption that the performance of the projector PJ2 is relatively lower than that of the projector PJ1 and the scope of the settable drive conditions of the projector PJ2 is narrower than that of the projector PJ1.

First Control Method

Figure 4:
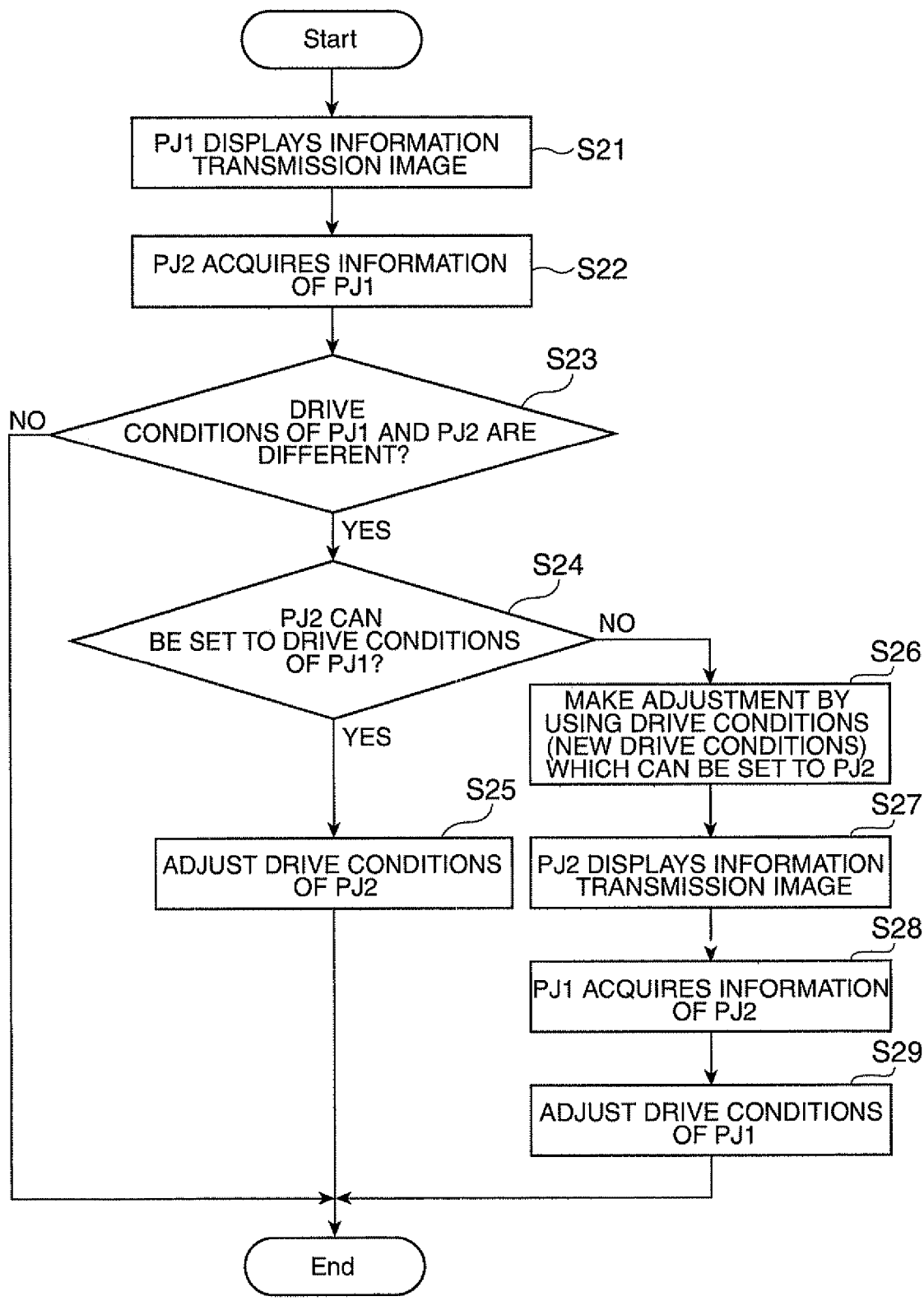
FIG. 4 is a flowchart showing a method for controlling the projection system of an embodiment of the invention.

FIG. 4 is a flowchart explaining a first control method performed when the projectors are different in performance.

The first control method includes an adjustment made to match the drive conditions of the projector with higher performance with the drive conditions of the projector with lower performance by changing a projector used as a criterion to the projector with lower performance in the course of the adjustment and newly providing the information on the drive conditions from the projector with lower performance.

First, as in the case with the control method shown in FIG. 3, the user selects a projector (for example, the projector PJ1) used as a criterion for drive conditions, and the projector PJ2 determines whether to change the drive conditions thereof based on the information on the drive conditions obtained from the information transmission image displayed by the projector PJ1 (steps S21 to S23).

When the drive conditions are identical, the projector PJ2 ends the drive condition adjustment processing without changing the settings of the drive conditions. When the drive conditions are different, the projector PJ2 determines whether the projector PJ2 can be set to the drive conditions of the projector PJ1 (step S24).

When the drive conditions are determined by the drive condition determination section 35, such determination can be made by, for example, referring to the performance of the projector PJ2, that is, a scope in which the drive conditions of the projector can be set and determining whether the drive conditions of the projector PJ1 are within the scope.

If the projector PJ2 can be set to the drive conditions of the projector PJ1, the projector PJ2 changes the drive conditions thereof to the drive conditions of the projector PJ1 in the manner as described above, for example (step S25).

On the other hand, if the projector PJ2 cannot be set to the drive conditions of the projector PJ1 because the performance of the projector PJ2 is lower than that of the projector PJ1, the projector PJ2 changes the drive conditions to a corresponding "operation mode" based on the current "operation mode" of the projector PJ1 (step S26).

For example, when the projector PJ1 is being driven in the operation mode "data mode" suitable for data display, the data mode of the projector PJ1 sets the drive conditions under which an illuminance of 5000 lm is obtained in white display, while the performance of the projector PJ2 only allows settings to be made such that an illuminance of 3500 lm is obtained in white display. In such a case, the projector PJ2 changes the drive conditions to the "data mode" thereof. At this point, although both of the projectors are being driven in the "data mode", the projectors do not produce the projected images of the same image quality due to the difference in model performance.

Therefore, the projector PJ2 then displays the information transmission image 11B including the information on the drive conditions changed to the "data mode" in the imaging area of the projector PJ1 (step S27).

In other words, since the projector PJ2 cannot be set to the drive conditions of the projector PJ1 specified by the user as a criterion, the projector PJ2 presents the drive conditions similar to the specified drive conditions to the projector PJ1 as the drive conditions which are newly used as a criterion.

The projector PJ1 takes the information transmission image 11B with the imaging apparatus 2 (step S28), and changes the drive conditions to match with the data mode of the projector PJ2 based on the drive conditions obtained from the information transmission image 11B (step S29).

In this way, adjustment of the drive conditions of the projection system, the adjustment performed by using the first control method when the projectors are different in performance, is carried out.

Second Control Method

Figure 5:
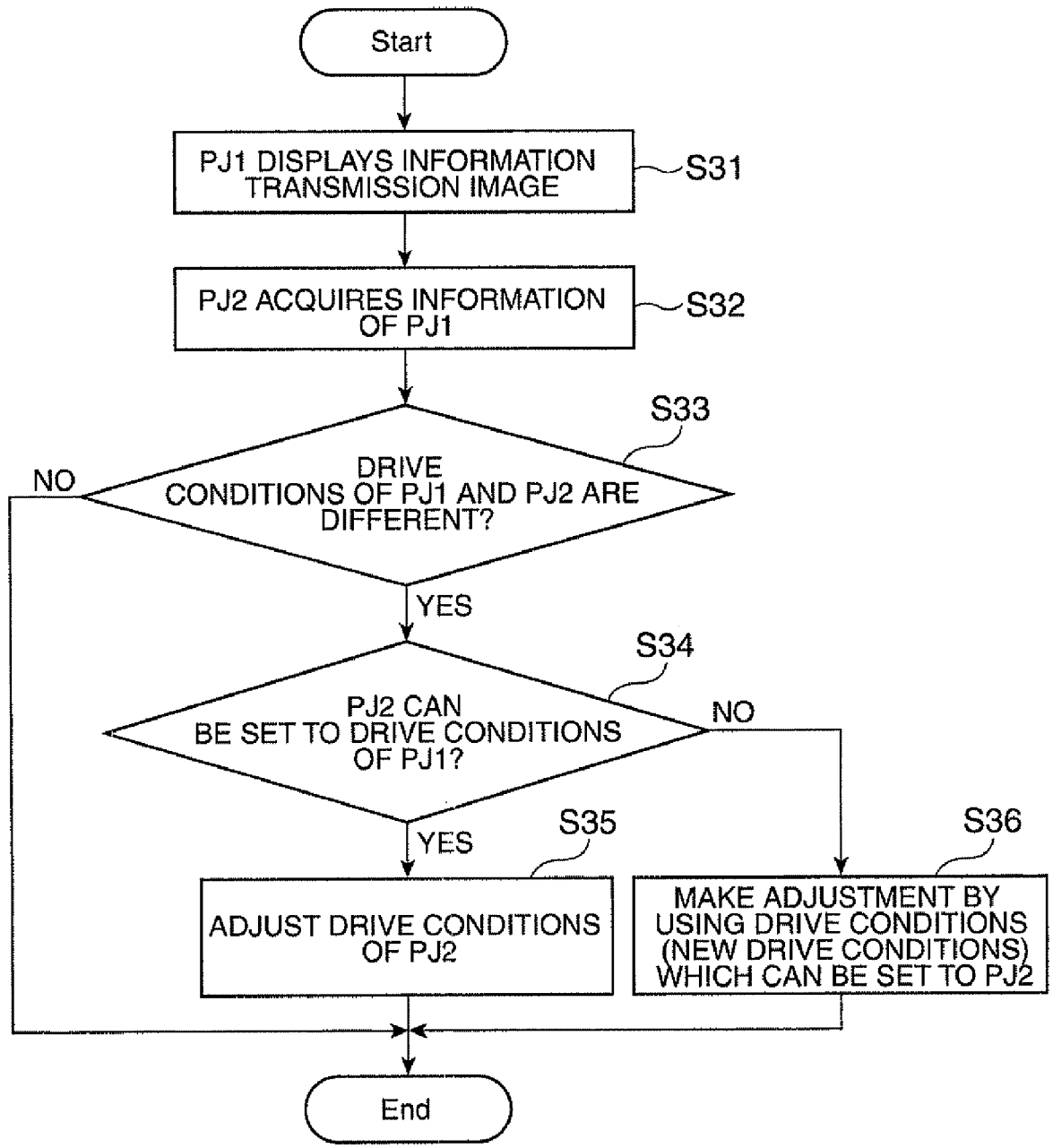
FIG. 5 is a flowchart showing a method for controlling the projection system of an embodiment of the invention.
Figure 6:
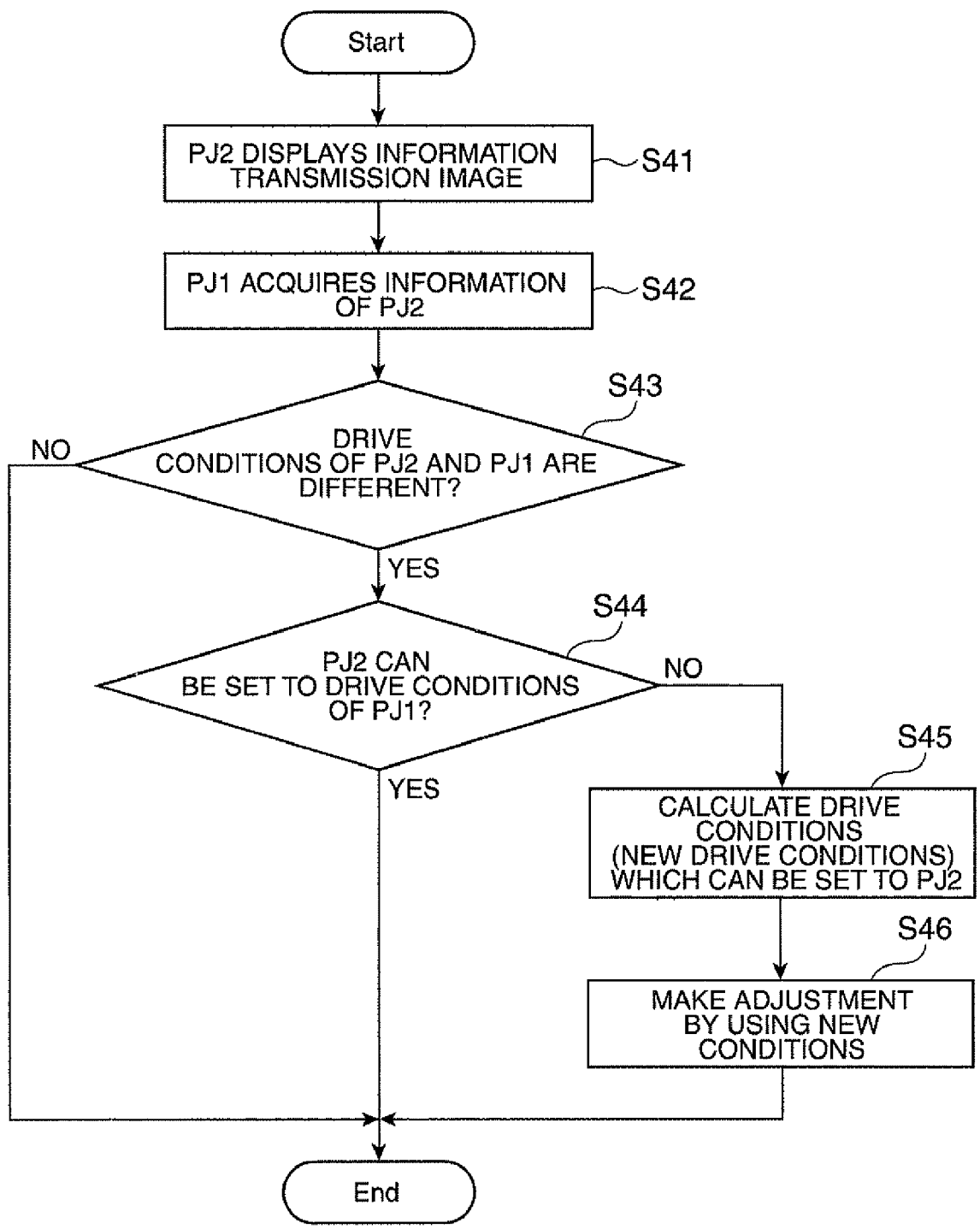
FIG. 6 is a flowchart showing a method for controlling the projection system of an embodiment of the invention.

FIGS. 5 and 6 are flowcharts explaining a second control method performed when the projectors are different in performance. FIG. 5 shows a flowchart for the projector PJ2, and FIG. 6 shows a flowchart for the projector PJ1.

Unlike the first control method, in the second control method, the projectors each display the information transmission image, acquire the information, and determine which projector is a projector with the drive conditions based on which adjustment is made.

Adjustment of the Projector PJ2

First, as in the case with the control method shown in FIG. 4, the user selects a projector (for example, the projector PJ1) used as a criterion for drive conditions. Then, the projector PJ2 determines whether adjustment of the drive conditions is required or not based on the information on the drive conditions obtained from the information transmission image displayed by the projector PJ1 (steps S31 to S33).

Then, when the drive conditions are identical, the projector PJ2 ends the drive condition adjustment processing without changing the settings of the drive conditions. When the drive conditions are different, a performance comparison is performed between the projectors to determine which is superior or inferior to the other in performance, and it is determined whether the drive conditions of one projector can be set to the drive conditions of the projector which is currently used as a criterion (here, the drive conditions of the projector PJ1). Based on the determination result, the projector PJ2 determines whether the projector PJ2 can be set to the drive conditions of the projector PJ1 (step S34).

When it is determined that the projector PJ2 can be set to the drive conditions of the projector PJ1, the projector PJ2 changes the drive conditions thereof to the drive conditions of the projector PJ1 (step S35).

On the other hand, when it is determined that the projector PJ2 cannot be set to the drive conditions of the projector PJ1, the projector PJ2 changes the drive conditions to a corresponding "operation mode" based on the current "operation mode" of the projector PJ1 (step S36).

Adjustment of the Projector PJ1

Likewise, the projector PJ1 determines whether adjustment of the drive conditions is required based on the information on the drive conditions obtained from the information transmission image displayed by the projector PJ2 (steps S41 to S43).

Then, when the drive conditions are identical, the projector PJ1 ends the drive condition adjustment processing without changing the settings of the drive conditions. When the drive conditions are different, a performance comparison is performed between the projectors to determine which is superior or inferior to the other in performance, and it is determined whether the drive conditions of one projector can be set to the drive conditions of the projector which is currently used as a criterion (here, the drive conditions of the projector PJ1). Based on the determination result, the projector PJ1 which is currently used as a criterion determines whether the projector PJ2 can be set to the drive conditions of the projector PJ1 (step S44).

When it is determined that the projector PJ2 can be set to the drive conditions of the projector PJ1, the projector PJ1 keeps the drive conditions thereof and ends the drive condition adjustment processing.

When it is determined that the projector PJ2 cannot be set to the drive conditions of the projector PJ1 which is currently used as a criterion, the projector PJ1 determines an "operation mode" corresponding to the current "operation mode" of the projector PJ1 based on the information on the "operation mode" included in the information transmission image 11B displayed by the projector PJ2. Then, the projector PJ1 calculates the drive conditions to which the projector PJ1 has to be changed, the drive conditions corresponding to the operation mode of the projector PJ2 (step S45).

Then, the projector PJ1 changes the drive conditions thereof to the newly calculated drive conditions (step S46).

In this way, adjustment of the drive conditions of the projection system, the adjustment performed by using the second control method when the projectors are different in performance, is carried out.

The projector configured as described above can facilitate unified control of the drive conditions of a plurality of projectors and improve usability.

Moreover, the projection system configured as described above can facilitate unified control of the drive conditions of the projectors.

Furthermore, with the above-configured method for controlling the projection system, it is possible to perform control for improving usability of the projection system.

Incidentally, this embodiment deals with a configuration in which both the projectors PJ1 and PJ2 display the information transmission image and have the imaging apparatus 2. However, when the projectors are identical in performance, the above-described unified control is possible as long as a projector used as a criterion displays the information transmission image and the other projector has the imaging apparatus.

Moreover, this embodiment deals with a method for first adjusting the drive conditions of the projector PJ2 based on the drive conditions of the projector PJ1. However, since the projectors PJ1 and PJ2 have a relative relationship, it is also possible to use the drive conditions of the projector PJ2 as a criterion.

Furthermore, in this embodiment, the control method has been described on the assumption that the drive conditions of the projectors PJ1 and PJ2 match with each other after adjustment. However, even when the drive conditions of the projectors PJ1 and PJ2 do not completely match with each other, as long as the drive conditions are controlled so as to be brought close to each other, it is possible to reduce a mismatch in image quality.

For example, when the projectors are different in performance, an operation mode corresponding to the operation mode of a projector used as a criterion may not be set in the other projector. Even in such a case, the other projector can bring the drive conditions close to the drive conditions of a projector used as a criterion by selecting, from the operation modes set therein, an operation mode with image quality similar to the image quality of the projected image of the projector used as a criterion and changing the drive conditions.

In such a case, it becomes easy to select a similar operation mode by setting a criterion as to on which drive condition of a plurality of drive conditions included in the operation mode emphasis is placed (for example, emphasis is placed on luminance in a "data mode" and on color in a "cinema mode") to obtain image quality similar to the image quality of the projected image of the projector used as a criterion.

Moreover, this embodiment deals with the projection system having two projectors PJ. However, a projection system having three or more projectors is also possible. In such a case, by first setting a projector used as a criterion and then adjusting the drive conditions between the adjacent projectors, it is possible to reflect the drive conditions of the projector used as a criterion in all the projectors and perform unified control.

Although the preferred embodiment of the invention has been described with reference to the accompanying drawings, it goes without saying that the embodiment is not meant to limit the invention in any way. The shapes, combinations, etc. of the component members described in the above embodiment are merely examples, and many modifications and variations are possible based on the design requirements etc. within the scope of the subject matter of the invention.

The entire disclosure of Japanese Patent Application No. 2009-222589, filed Sep. 28, 2009 is expressly incorporated by reference herein.

What is claimed is:

1. A projector projecting an image, comprising:
an imaging unit taking an information transmission image which is part of a projected image of an other projector and includes drive condition information of the other projector; and
a control unit changing drive conditions of the projector based on the drive condition information included in the information transmission image,
wherein the projector changes the drive conditions thereof in such a way that the drive conditions are brought close to the other projector's drive conditions based on both the projector's and the other projector's drive condition information included in the information transmission image taken by the imaging unit of the projector and an information transmission image taken by an imaging unit of the other projector.

2. The projector according to claim 1, wherein the control unit performs control so as to bring the drive conditions of the projector close to drive conditions of the other projector.

3. The projector according to claim 1, wherein the projector can display the information transmission image including the drive conditions thereof in a position where the information transmission image does not overlap the information transmission image of the other projector.

4. The projector according to claim 3, wherein the information transmission image is formed by using infrared light.

5. The projector according to claim 3, wherein the information transmission image is formed by using image data which is the drive condition information converted into a code.

6. The projector according to claim 1, wherein the information transmission image is formed by using infrared light.

7. The projector according to claim 1, wherein the information transmission image is formed by using image data which is the drive condition information converted into a code.

8. A projection system, comprising:
a pair of projectors performing image display in adjacent areas, wherein
one projector displays an information transmission image including drive condition information thereof,
an other projector has an imaging unit that can take the information transmission image, and changes drive conditions thereof based on the drive condition information of the one projector, the drive condition information being included in the information transmission image taken by the imaging unit,
each of the pair of projectors displays the information transmission image and has the imaging unit, and
the pair of projectors changes the drive conditions thereof in such a way that the drive conditions are brought close to each other's drive conditions based on each other's drive condition information included in the information transmission images taken by the imaging units of the pair of projectors.

9. The projection system according to claim 8, wherein the other projector performs control so as to bring the drive conditions thereof close to drive conditions of the one projector based on the drive condition information of the one projector.

10. The projector system according to claim 8, wherein the other projector can display the information transmission image including the drive conditions thereof in a position where the information transmission image does not overlap the information transmission image of the one projector.

11. A method for controlling a projection system having a pair of projectors, comprising:
displaying an information transmission image by one projector, the information transmission image including drive condition information of the one projector;
taking the information transmission image displayed by the one projector with an imaging unit of an other projector; and
changing drive conditions of the other projector based on the drive condition information of the one projector, the drive condition information being included in the information transmission image, displaying an information transmission image by the other projector, the information transmission image including drive condition information of the other projector;

taking the information transmission image displayed by the other projector with an imaging unit of the one projector; and changing drive conditions of the one projector based on the drive condition information of the other projector, the drive condition information being included in the information transmission image, wherein the projectors change the drive conditions of the projectors in such a way that the drive conditions are brought close to each other's drive conditions based on each other's drive condition information included in the information transmission images.

* * * * *